(12) United States Patent
Takahashi et al.

(10) Patent No.: US 11,506,288 B2
(45) Date of Patent: Nov. 22, 2022

(54) SHAFT SEAL DEVICE

(71) Applicant: Eagle Industry Co., Ltd., Tokyo (JP)

(72) Inventors: Hidekazu Takahashi, Tokyo (JP); Yoshihisa Takano, Tokyo (JP)

(73) Assignee: EAGLE INDUSTRY CO., LTD.

( * ) Notice: Subject to any disclaimer, the term of this patent is extended or adjusted under 35 U.S.C. 154(b) by 294 days.

(21) Appl. No.: 16/627,965

(22) PCT Filed: Jul. 11, 2018

(86) PCT No.: PCT/JP2018/026127
§ 371 (c)(1),
(2) Date: Dec. 31, 2019

(87) PCT Pub. No.: WO2019/017250
PCT Pub. Date: Jan. 24, 2019

(65) Prior Publication Data
US 2020/0132197 A1    Apr. 30, 2020

(30) Foreign Application Priority Data

Jul. 18, 2017   (JP) .............................. JP2017-139442

(51) Int. Cl.
*F16J 15/43* (2006.01)
*F16J 15/3276* (2016.01)

(52) U.S. Cl.
CPC ........... *F16J 15/43* (2013.01); *F16J 15/3276* (2013.01)

(58) Field of Classification Search
CPC ................................ F16J 15/43; F16J 15/3276
See application file for complete search history.

(56) References Cited

U.S. PATENT DOCUMENTS 3,612,549 A * 10/1971 Berkowitz ............... F16J 15/43
                                                                   277/410
4,407,518 A * 10/1983 Moskowitz .............. F16J 15/43
                                                                   277/928
4,772,032 A *  9/1988 Raj ......................... F16J 15/43
(Continued)

FOREIGN PATENT DOCUMENTS

CN          2918902         7/2007  ............... F16J 15/43
JP       61236971  A *    10/1986
JP       01088117  A *     4/1989
(Continued)

OTHER PUBLICATIONS

International Search Report (w/translation) and Written Opinion (w/machine translation) issued in application No. PCT/JP2018/026127, dated Sep. 18, 2018 (10 pgs).
(Continued)

*Primary Examiner* — Vishal A Patel
(74) *Attorney, Agent, or Firm* — Hayes Soloway P.C.

(57) ABSTRACT

The shaft seal device includes a seal cover formed in a tubular shaped and provided on an outer periphery of a rotation shaft which is inserted into an axial hole of a housing, a flexible member that connects the seal cover to the housing, an auxiliary seal portion provided on an interior side of the shaft seal device in an axial direction of the seal cover, a magnetic fluid seal portion provided on an exterior side of the shaft seal device from the auxiliary seal portion in the axial direction of the seal cover, and bearings that support a load of the magnetic fluid seal portion.

15 Claims, 5 Drawing Sheets

(56) References Cited

U.S. PATENT DOCUMENTS

| | | | | |
|---|---|---|---|---|
| 5,106,593 A | * | 4/1992 | Mizuishi | C30B 15/30 |
| | | | | 117/917 |
| 5,234,303 A | * | 8/1993 | Koyano | H01L 21/67742 |
| | | | | 414/217 |

FOREIGN PATENT DOCUMENTS

| | | | |
|---|---|---|---|
| JP | H04117962 | | 10/1992 |
| JP | H06307551 | | 11/1994 |
| JP | 2000002339 | | 1/2000 |
| JP | 2000205418 | | 7/2000 |
| JP | 2000205418 A | * | 7/2000 |

OTHER PUBLICATIONS

Taiwanese Office Action (w/translation) issued in application No. 107124170, dated Oct. 5, 2019 (9 pgs).
Chinese Office Action (w/translation) issued in application No. 201880042215.6, dated Dec. 25, 2020 (13 pgs).
Notification of the Reasons for Refusal issued in Korean Appln. No. 10-2019-7038845, dated Apr. 27, 2021, with English translation, 13 pages.
International Preliminary Report on Patentability issued in application No. PCT/JP2018/026127, dated Jan. 21, 2020 (9 pgs).
Taiwanese Office Action (w/translation) issued in application No. 107124170, dated Jan. 30, 2020 (5 pgs).
Notification of the Reasons for Refusal issued in Korean Appln. No. 10-2019-7038845, dated Oct. 13, 2021, with English translation, 6 pages.

* cited by examiner

SHAFT SEAL DEVICE

TECHNICAL FIELD

The present invention relates to a shaft seal device to be used for a machine in which pressure is maintained to be lower in an internal sealed space of the machine than in an external space of the machine.

BACKGROUND ART

A conventional shaft seal device in which pressure is maintained to be lower in the internal sealed space than in the external space, for example, maintained to be vacuum in the sealed space, is used for, for example, a powder machine configured to seal an annular clearance between an axial hole provided in a housing of the powder machine and a rotation shaft passing through the axial hole, and prevent leakage of powder sealed in the sealed space of the powder machine in a vacuum state and an inflow of foreign substances to the sealed space.

As another conventional shaft seal device, a vacuum seal bearing device is disclosed in Patent Citation 1. The vacuum seal bearing device is mainly formed by a tubular bearing box attached to an axial hole of a frame of a vacuum device for inserting a delivery roll via a bellows, a magnetic seal provided between an inner periphery of the bearing box and an outer periphery of the delivery roll at the center of the bearing box in the axial direction, a pair of bearings provided on both the sides of the magnetic seal for holding a gap of the magnetic seal and positioning in the axial direction, and a pair of mechanical seals that seals a portion between the delivery roll and the bearing box on both the sides of the bearing box in the axial direction. A load applied to the delivery roll itself is supported by bearings which are different and independent from the bearings provided on both the sides of the magnetic seal. The bearings provided on both the sides of the magnetic seal have a structure of supporting a load of the magnetic seal, and are capable of suppressing a change in the gap size and the axial position of the magnetic seal due to a warp of the delivery roll.

CITATION LIST

Patent Literature

Patent Citation 1: JP 6-307551 A (Page 2, FIG. 4)

SUMMARY OF INVENTION

Technical Problem

However, in Patent Citation 1, the bearing box is attached to be relatively movable with respect to the frame by the flexible bellows. Thus, there is a possibility that due to an inclination, etc. of the delivery roll passing through the bearing box, a gap of a sliding surface formed between a stationary ring and a rotating ring of the mechanical seal that seals the passing-through portion is changed and a sealing property is lowered. It is not possible to prevent an influence on the magnetic seal by a pressure difference between pressure in the frame (i.e., internal pressure of the machine) in a vacuum state and pressure in the bearing box (i.e., external pressure of the machine such as atmospheric pressure) across the mechanical seal. For example, there is a problem that since a magnetic fluid held in the gap of the magnetic seal is pulled to the frame side by the pressure difference, the sealing property and durability of the magnetic seal are lowered.

The present invention is achieved focusing on such a problem, and an object thereof is to provide a shaft seal device in which a sealing property and durability of a magnetic fluid seal portion can be maintained in good condition.

Solution to Problem

In order to solve the foregoing problem, a shaft seal device according to a first aspect of the present invention includes a seal cover formed in a cylindrical shape and provided on an outer periphery of a rotation shaft which is inserted into an axial hole of a housing, a flexible member that connects the seal cover to the housing, an auxiliary seal portion provided on an interior side of the shaft seal device in an axial direction of the seal cover, a magnetic fluid seal portion provided on an exterior side of the shaft seal device from the auxiliary seal portion in the axial direction of the seal cover, and a bearing unit that supports a load of the magnetic fluid seal portion. The shaft seal device seals an annular clearance formed between the axial hole of the housing and the rotation shaft inserted into the axial hole. A pressure buffering chamber in which pressure is maintained to be lower than pressure in an external space of the housing is provided between the auxiliary seal portion and the magnetic fluid seal portion in the seal cover.

According to the first aspect, in the seal cover connected to the housing by the flexible member, the pressure of the pressure buffering chamber provided between the auxiliary seal portion and the magnetic fluid seal portion is maintained to be lower than the pressure of the exterior. Thereby, a pressure difference between an internal sealed space in which pressure is maintained to be lower than the pressures of the external space and the pressure buffering chamber is small. Thus, movement of a fluid, etc. between the sealed space and the pressure buffering chamber is small. Even when a sealing property of the auxiliary seal portion is lowered by an inclination, etc. of the rotation shaft, it is possible to maintain a sealing property and durability of the magnetic fluid seal portion, and also suppress an inflow of a magnetic fluid and foreign substances such as a contaminant to the interior side of the housing.

In the shaft seal device according to a second aspect of the present invention, the pressure in the pressure buffering chamber is maintained to be equivalent to pressure in a sealed space.

According to the second aspect, since the pressure in the pressure buffering chamber is maintained to be equivalent to the pressure in the sealed space, the pressure difference is not easily generated between the sealed space and the pressure buffering chamber even when the sealing property of the auxiliary seal portion is lowered. Thus, by suppressing the movement of the fluid between the sealed space and the pressure buffering chamber, it is possible to prevent the inflow of the magnetic fluid and the foreign substances such as the contaminant to the interior and an inflow of foreign substances from the sealed space to the pressure buffering chamber.

In the shaft seal device according to a third aspect of the present invention, the auxiliary seal portion is formed by a contactless seal.

According to the third aspect, since the auxiliary seal portion is formed by the contactless seal, abrasion powder is not generated from the auxiliary seal portion by rotation of the rotation shaft. Thus, it is possible to prevent an inflow of the abrasion powder to the sealed space and the pressure buffering chamber.

In the shaft seal device according to a fourth aspect of the present invention, the flexible member is a diaphragm having an aligning property.

According to the fourth aspect, since the seal cover is connected to be relatively movable with respect to the housing by the diaphragm having the aligning property, it is possible to make alignment in such a manner that the shaft seal device to be relatively moved with respect to the housing together with the rotation shaft is restored to the center axis of the axial hole of the housing. Thus, it is possible to enhance precision in attaching the shaft seal device to the housing.

In the shaft seal device according to a fifth aspect of the present invention, a communication passage providing communication between the pressure buffering chamber and a vacuum pump is provided in the seal cover at a position between the auxiliary seal portion and the magnetic fluid seal portion in the axial direction of the seal cover.

According to the fifth aspect, since in the seal cover, the communication passage providing communication between the pressure buffering chamber and the vacuum pump is provided at the position between the auxiliary seal portion and the magnetic fluid seal portion in the axial direction, it is possible to discharge a contaminant in the pressure buffering chamber from the communication passage without reaching the magnetic fluid seal portion. Thus, it is possible to prevent a decrease in the sealing property and the durability of the magnetic fluid seal portion.

In the shaft seal device according to a sixth aspect of the present invention the vacuum pump is connected to the communication passage by a flexible pipe from an outer periphery side of the seal cover.

According to the sixth aspect, since the vacuum pump is connected to the communication passage provided in the seal cover by the flexible pipe, even upon relatively moving the shaft seal device with respect to the housing by the flexible member, the flexible pipe is deformed and follows. Thus, it is possible to stably adjust the pressure of the pressure buffering chamber by the vacuum pump.

The shaft seal device according to a seventh aspect of the present invention includes a sleeve fixable to the outer periphery of the rotation shaft, the auxiliary seal portion, the magnetic fluid seal portion, and the bearing unit are integrally provided between an inner periphery of the seal cover and an outer periphery of the sleeve, thereby unitizing the sleeve, the seal cover, the auxiliary seal portion, the magnetic fluid seal portion and the bearing unit.

According to the seventh aspect, by integrally providing the auxiliary seal portion, the magnetic fluid seal portion, and the bearing unit between the inner periphery of the seal cover and the outer periphery of the sleeve, the shaft seal device is unitized. Thus, it is possible to easily attach and detach the shaft seal device to and from the housing and the rotation shaft.

In the shaft seal device according to an eighth aspect of the present invention, the bearing unit is a pair of bearings provided across the magnetic fluid seal portion in the axial direction. An inner ring of one of the pair of bearings is not regulated in the axial direction with respect to the outer periphery of the sleeve, or an outer ring of one of the pair of bearings is not regulated in the axial direction with respect to the periphery of the seal cover.

According to the eighth aspect, even upon relatively moving the seal cover and the sleeve with respect to each other in the axial direction due to thermal expansion/contraction of the rotation shaft, etc., since the inner ring or the outer ring of the pair of bearings provided across the magnetic fluid seal portion is not regulated in the axial direction with respect to outer periphery of the sleeve or the inner periphery of the seal cover and is relatively movable in the axial direction, it is possible to release stress applied to the unitized shaft seal device by the bearings.

DESCRIPTION OF EMBODIMENTS

Hereinafter, modes for carrying out a shaft seal device according to the present invention will be described based on embodiments.

First Embodiment

A first embodiment of the shaft seal device according to the present invention will be described with reference to FIG. 1. Hereinafter, the left side on the paper plane of FIG. 1 will be referred to as the interior side of a powder machine to which the shaft seal device is attached, and the right side on the paper plane of FIG. 1 will be referred to as the exterior side of the powder machine to which the shaft seal device is attached.

In the present embodiment, the shaft seal device is used for sealing an annular clearance between a rotation shaft that rotates a screw provided for conveying powder which is sealed in a housing of a vacuum dryer (also referred to as a powder machine) in a vacuum state, and an axial hole provided in the housing of the vacuum dryer.

Figure 1:
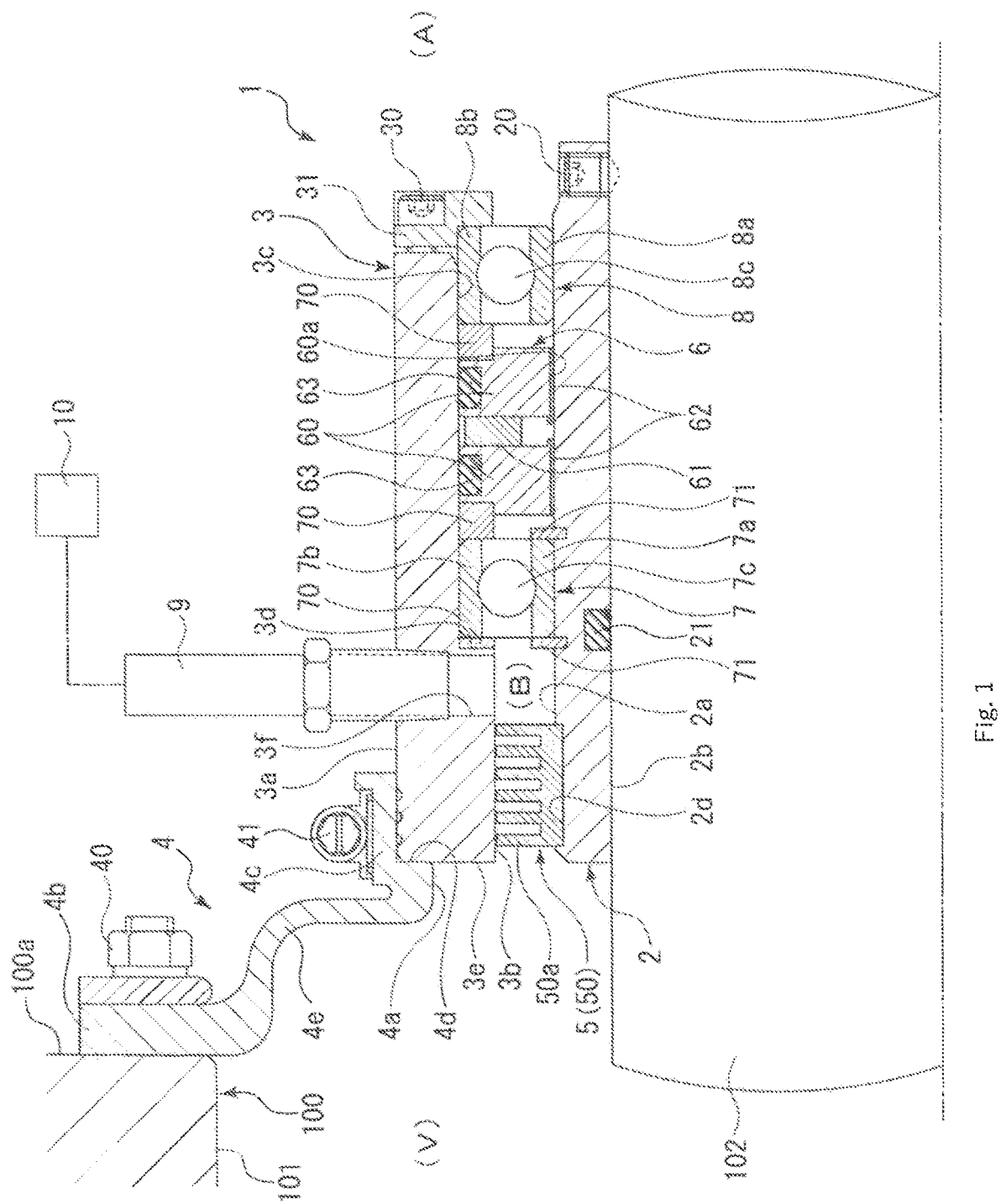
FIG. 1 is a front sectional view showing a first embodiment of a shaft seal device according to the present invention.

As shown in FIG. 1, an axial hole 101 is provided in a housing 100 of a vacuum dryer, and a rotation shaft 102 is inserted into the axial hole 101. An internal sealed space of the housing 100 (also simply referred to as an interior) of the vacuum dryer is shown as a sealed space V formed into a vacuum state. On the axially interior side of the rotation shaft 102, a screw for conveying powder (not shown) is provided. By heating the powder sealed in the interior of the vacuum dryer at the time of conveying, water contents are evaporated and the powder is dried. An external space of the housing 100 (also simply referred to as an exterior) of the vacuum dryer is shown as a space A in the atmosphere such as a clean room.

As shown in FIG. 1, a shaft seal device 1 includes a cylindrical sleeve 2 fixed to an outer periphery of the rotation shaft 102, a cylindrical seal cover 3 provided on an outer periphery of the sleeve 2, a diaphragm 4 (serving as a flexible member) that connects the seal cover 3 to a side end surface 100a on the exterior side of the housing 100 of the vacuum dryer, an auxiliary seal portion 5 provided on the axially interior side between an inner peripheral surface (i.e., a first inner peripheral surface 3b and a second inner peripheral surface 3c to be described later) of the seal cover 3 and an outer peripheral surface 2a of the sleeve 2, a magnetic fluid seal portion 6 provided on the axially exterior side of the auxiliary seal portion 5, a bearing 7 provided on the axially interior side of the magnetic fluid seal portion 6, and a bearing 8 provided on the axially exterior side of the magnetic fluid seal portion 6, the bearings 7 and 8 forming a bearing unit.

The sleeve 2 is made of metal such as stainless steel, and formed to have an inner diameter having the substantially same size as an outer diameter of the rotation shaft 10 and formed in a cylindrical shape. By putting a set screw 20 into a screw hole provided in an end portion on the axially exterior side, the sleeve is fixed to the outer periphery of the rotation shaft 102. A gap between the inner peripheral surface 2b of the sleeve 2 and the outer periphery of the rotation shaft 102 is sealed by an O ring 21 press-fitted into an annular groove portion formed on the inner peripheral surface 2b of the sleeve 2.

The seal cover 3 is made of metal such as stainless steel, and is formed in a stepped cylindrical shape formed by the first inner peripheral surface 3b in which the auxiliary seal portion 5 is arranged on the axially interior side, and a second inner peripheral surface 3c formed to have a larger diameter than the first inner peripheral surface 3b on the axially exterior side of the first inner peripheral surface 3b, the second inner peripheral surface in which the magnetic fluid seal portion 6 and the bearings 7, 8 are arranged. On the axially exterior side of the first inner peripheral surface 3b, an annular surface portion 3d extending in the radial direction is formed. An outer diameter part of this annular surface portion 3d is orthogonal and continuous to an axially interior side part of the second inner peripheral surface 3c.

The diaphragm 4 is made of rubber, and formed in a disc shape in which an axial hole 4a passing through in the axial direction is formed on the inner diameter side. By air-tightly fixing an outer diameter side end portion 4b to the side end surface 100a on the exterior side of the housing 100 of the vacuum dryer by a bolt 40, and tightly fastening an inner diameter side end portion 4c to an outer periphery 3a of the end portion on the axially interior side of the seal cover 3 by a hose band 41, the seal cover 3 is connected to the housing 100. An annular recess portion 4d recessed on the axially interior side is formed on an inner periphery of the inner diameter side end portion 4c of the diaphragm 4, and a side end surface 3e on the axially interior side of the seal cover 3 is abutted with a bottom portion of the annular recess portion 4d.

By forming a curved portion 4e between the outer diameter side end portion 4b and the inner diameter side end portion 4c, the diaphragm 4 has flexibility and an aligning property in the axial direction and the radial direction. According to this, even when an inclination or vibration of the rotation shaft 102 is generated, by the flexibility of the diaphragm 4, it is possible to support the shaft seal device 1 relatively movably with respect to the housing 100, and elastically restore the center axis of the rotation shaft 102 and the shaft seal device 1 to align with the center axis of the axial hole 101 of the housing 100. Thus, it is possible to enhance precision in attaching the shaft seal device 1 to the axial hole 101 of the housing 100. The diaphragm 4 is different from a bellows formed in an accordion shape particularly in terms of the aligning property.

The auxiliary seal portion 5 is formed by a labyrinth seal 50 which is a general contactless seal, and air-tightly fixed to an annular recess portion 2d formed on the axially interior side of the outer peripheral surface 2a of the sleeve 2. An outer diameter of the labyrinth seal 50 forming the auxiliary seal portion 5 is formed to be a smaller diameter than the first inner peripheral surface 3b of the seal cover 3. A gap between an outer periphery of the labyrinth seal 50 and the first inner peripheral surface 3b of the seal cover 3 is sealed, by decreasing degree of a pressure drop for a single step with fins 50a of the labyrinth seal 50 provided in multiple steps so as to reduce a leakage amount, the gap being formed between the sealed space V of the interior of the vacuum dryer and a pressure buffering chamber B. A contactless seal other than the labyrinth seal may be applied to the auxiliary seal portion 5. The labyrinth seal may be air-tightly fixed on a side of the seal cover 3.

The magnetic fluid seal portion 6 is mainly formed by a pair of annular pole pieces 60, 60, a permanent magnet 61 arranged between the pole pieces 60, 60, and a magnetic fluid 62.

The pole pieces 60, 60 are formed to have an outer diameter having the substantially same size as an inner diameter of the second inner peripheral surface 3c of the seal cover 3. The gaps between outer peripheries of the pole pieces 60, 60 and the second inner peripheral surface 3c of the seal cover 3 are sealed by O rings 63, 63 press-fitted into annular groove portions formed on the outer peripheries of the pole pieces 60, 60.

The pole pieces 60, 60 are formed to have an inner diameter larger than an outer diameter of the sleeve 2. In a gap formed between inner peripheral surfaces 60a, 60a of the pole pieces 60, 60 and the outer peripheral surface 2a of the sleeve 2, a seal film of the magnetic fluid 62 is formed and held by magnetic force of a magnetic circuit formed by the pole pieces 60, 60 and the permanent magnet 61. Thereby, the gap is sealed between the space A of the exterior of the vacuum dryer and the pressure buffering chamber B to be described later is sealed.

The magnetic fluid 62 may have a base oil of perfluoropolyether expressed by a general formula $F[CF(CF_3)CF_2O]nRf$ (Rf is a perfluoro lower alkyl group, and n indicates a numeric value of an average of 5 or more) and thereby, it is possible to form a seal film excellent in vaporization resistance and pressure resistance.

The bearings 7, 8 are general ball bearings. By holding plural balls 7c, 8c between inner rings 7a, 8a and outer rings 7b, 8b, the inner rings 7a, 8a and the outer rings 7b, 8b are relatively rotatable with respect to each other. Although not shown for convenience of description, the shaft seal device 1 has a support structure in which a load of the rotation shaft 102 is supported by bearings which are different and independent from the bearings 7, 8, the support structure in which a load of the magnetic fluid seal portion 6 is supported by the bearings 7, 8 provided on both the sides in the axial direction of the magnetic fluid seal portion 6. Thus, it is possible to make a gap in which the magnetic fluid 62 is held in the magnetic fluid seal portion 6 constant, and maintain a sealing property and durability of the magnetic fluid seal portion 6.

The outer rings 7b, 8b of the bearings 7, 8 are fixed between the annular surface portion 3d of the seal cover 3 and a regulating member 31 by fastening the annular regulating member 31 to an end portion on the axially exterior side of the seal cover 3 by a bolt 30 in a state where plural spacers 70 are placed between the pole pieces 60, 60 and the permanent magnet 61 forming the magnetic fluid seal portion 6.

The inner ring 7a of the bearing 7 is regulated in the axial direction by being nipped by a pair of stoppers 71, 71 fitted to an annular groove portion which is formed on the outer periphery of the sleeve 2. The inner ring 8a of the bearing 8 is not regulated in the axial direction with respect to the outer periphery of the sleeve 2 but relatively movable in the axial direction with respect to the sleeve 2.

In such a way, in the shaft seal device 1, by integrally providing the auxiliary seal portion 5, the magnetic fluid seal portion 6, and the bearings 7, 8 between the first inner peripheral surface 3b and the second inner peripheral surface 3c of the seal cover 3 and the outer peripheral surface 2a of the sleeve 2, the sleeve 2, the seal cover 3, the auxiliary seal portion 5, the magnetic fluid seal portion 6, and the bearing 7, 8 are unitized. In the shaft seal device 1, the sleeve 2, the auxiliary seal portion 5, and the inner rings 7a, 8a of the bearing 7, 8 form rotating side sealing elements to be rotated together with the rotation shaft 102, and the seal cover 3, the diaphragm 4, the magnetic fluid seal portion 6, and the outer rings 7b, 8b of the bearings 7, 8 form stationary side sealing elements.

Between the first inner peripheral surface 3b and the second inner peripheral surface 3c of the seal cover 3 forming the unitized shaft seal device 1 and the outer peripheral surface 2a of the sleeve 2, the pressure buffering chamber B in which pressure is maintained to be vacuum which is lower than pressure of the exterior of the vacuum dryer, that is, the atmospheric pressure of the space A, is provided between the auxiliary seal portion 5 and the magnetic fluid seal portion 6.

In detail, in the seal cover 3, a communication passage 3f communicating with the pressure buffering chamber B is provided at a position between the auxiliary seal portion 5 and the bearing 7 on the axially interior side. A vacuum pump 10 is connected to the communication passage 3f by a flexible pipe 9 from the outer periphery side of the seal cover 3. By the vacuum pump 10, in the pressure buffering chamber B, the pressure is maintained to be equivalent to pressure of the sealed space V of the interior of the vacuum dryer (the substantially same pressure which is the substantially same vacuum degree). Since the vacuum pump 10 is connected via the flexible pipe 9, even upon relatively moving the shaft seal device 1 with respect to the housing 100 of the vacuum dryer by the diaphragm 4, the pipe 9 is deformed and follows. Thus, it is possible to stably adjust the pressure of the pressure buffering chamber B by the vacuum pump 10. The vacuum pump 10 may be exclusive for the pressure buffering chamber B or may be used together with a vacuum pump for the interior.

According to this, in the shaft seal device 1, between the first inner peripheral surface 3b and the second inner peripheral surface 3c of the seal cover 3 connected to the housing 100 of the vacuum dryer by the diaphragm 4 and the outer peripheral surface 2a of the sleeve 2, the pressure of the pressure buffering chamber B provided between the auxiliary seal portion 5 and the magnetic fluid seal portion 6 is maintained to be lower than the atmospheric pressure of the space A of the exterior of the vacuum dryer, in detail, to be equivalent to the pressure of the sealed space V of the interior of the vacuum dryer. Thereby, a pressure difference between the sealed space V of the interior of the vacuum dryer in a vacuum state and the pressure buffering chamber B is small. Thus, even when a sealing property of the auxiliary seal portion 5 is lowered by an inclination, etc. of the rotation shaft 102, it is possible to maintain the sealing property and the durability of the magnetic fluid seal portion 6, and also suppress an inflow of the magnetic fluid 62 and foreign substances such as a contaminant to the interior side.

Since in the pressure buffering chamber B, the pressure is maintained to be equivalent to the pressure of the sealed space V of the interior of the vacuum dryer, a pressure difference is not easily generated between the sealed space V of the interior of the vacuum dryer and the pressure buffering chamber B even when the sealing property of the auxiliary seal portion 5 is lowered. Thus, by suppressing the movement of the fluid between the sealed space V of the interior of the vacuum dryer and the pressure buffering chamber B, it is possible to prevent the inflow of the magnetic fluid 62 and the foreign substances such as the contaminant to the sealed space V and an inflow of powder to the pressure buffering chamber B. Thereby, it is possible to prevent a decrease in a purity degree of powder sealed in the interior of the vacuum dryer. In addition, the rotation shaft 102 is relatively rotated with respect to the seal cover 3 but does not reciprocate in the axial direction. Thus, in comparison to a reciprocation-type rotating shaft, there is almost no leakage of the magnetic fluid 62.

Since the auxiliary seal portion 5 is formed by the labyrinth seal 50 which is the contactless seal, abrasion powder is not generated from the auxiliary seal portion 5 by rotation of the rotation shaft 102. Thus, it is possible to prevent an inflow of the abrasion powder to the sealed space V of the interior and the pressure buffering chamber B. Further, it is possible to prevent damage of the bearing 7 due to the inflow of the abrasion powder to the bearing 7 provided in the pressure buffering chamber B. Thus, it is possible to stably support the load of the magnetic fluid seal portion 6 by the bearings 7, 8.

Since in the seal cover 3, the communication passage 3f providing communication between the pressure buffering chamber B and the vacuum pump 10 is provided at the position between the auxiliary seal portion 5 and the bearing 7 on the axially interior side in the axial direction, it is possible to discharge the foreign substances such as the contaminant in the pressure buffering chamber B from the communication passage 3f by an operation of the vacuum pump 10 without reaching the magnetic fluid seal portion 6. Thus, it is possible to prevent a decrease in the sealing property and the durability of the magnetic fluid seal portion 6.

Since the sealing property and the durability of the magnetic fluid seal portion 6 are maintained, on the axially exterior side of the shaft seal device 1, suction of the atmosphere of the space A of the exterior is reliably prevented by the magnetic fluid seal portion 6, and it is possible to suppress a variation in the pressure in the pressure buffering chamber B. This means that the pressure in the vacuum pump 10 can be easily adjusted.

By integrally providing the auxiliary seal portion 5, the magnetic fluid seal portion 6, and the bearings 7, 8 between the first inner peripheral surface 3b and the second inner peripheral surface 3c of the seal cover 3 and the outer peripheral surface 2a of the sleeve 2, the shaft seal device 1 is unitized. Thus, it is possible to easily attach and detach the shaft seal device 1 to and from the housing 100 of the vacuum dryer and the rotation shaft 102, and enhance workability and a maintenance property.

In the bearing 7 provided on the axially interior side, the inner ring 7a and the outer ring 7b are regulated in the axial direction respectively with respect to an inner periphery of the seal cover 3 and the outer periphery of the sleeve 2. Thus, it is possible to always stably apply the load of the magnetic fluid seal portion 6 to the bearing 7.

Further, in the bearing 8 provided on the axially exterior side, the inner ring 8a is not regulated in the axial direction with respect to the outer periphery of the sleeve 2. Thus, even upon relatively moving the seal cover 3 and the sleeve 2 with respect to each other in the axial direction due to thermal expansion/contraction of the rotation shaft 102, etc., since the inner ring 8a of the bearing 8 is relatively movable in the axial direction, it is possible to release stress applied to the unitized shaft seal device 1 by the bearing 8. Thereby, an eccentric load is not easily applied to the pair of bearings 7, 8 provided across the magnetic fluid seal portion 6, the bearings that support the load of the magnetic fluid seal portion 6. Thus, it is possible to prevent damage of the bearings 7, 8. In addition, the bearing 8 for atmosphere is less expensive and more excellent in durability than the bearing 7 for vacuum. Thus, a bearing relatively movable in the axial direction preferably serves as the bearing 8 for atmosphere.

Second Embodiment

Next, a second embodiment of the shaft seal device according to the present invention will be described with reference to FIG. 2. The same constituent parts as the constituent parts shown in the above embodiment will be given the same reference signs and duplicated description will be omitted.

Figure 2:
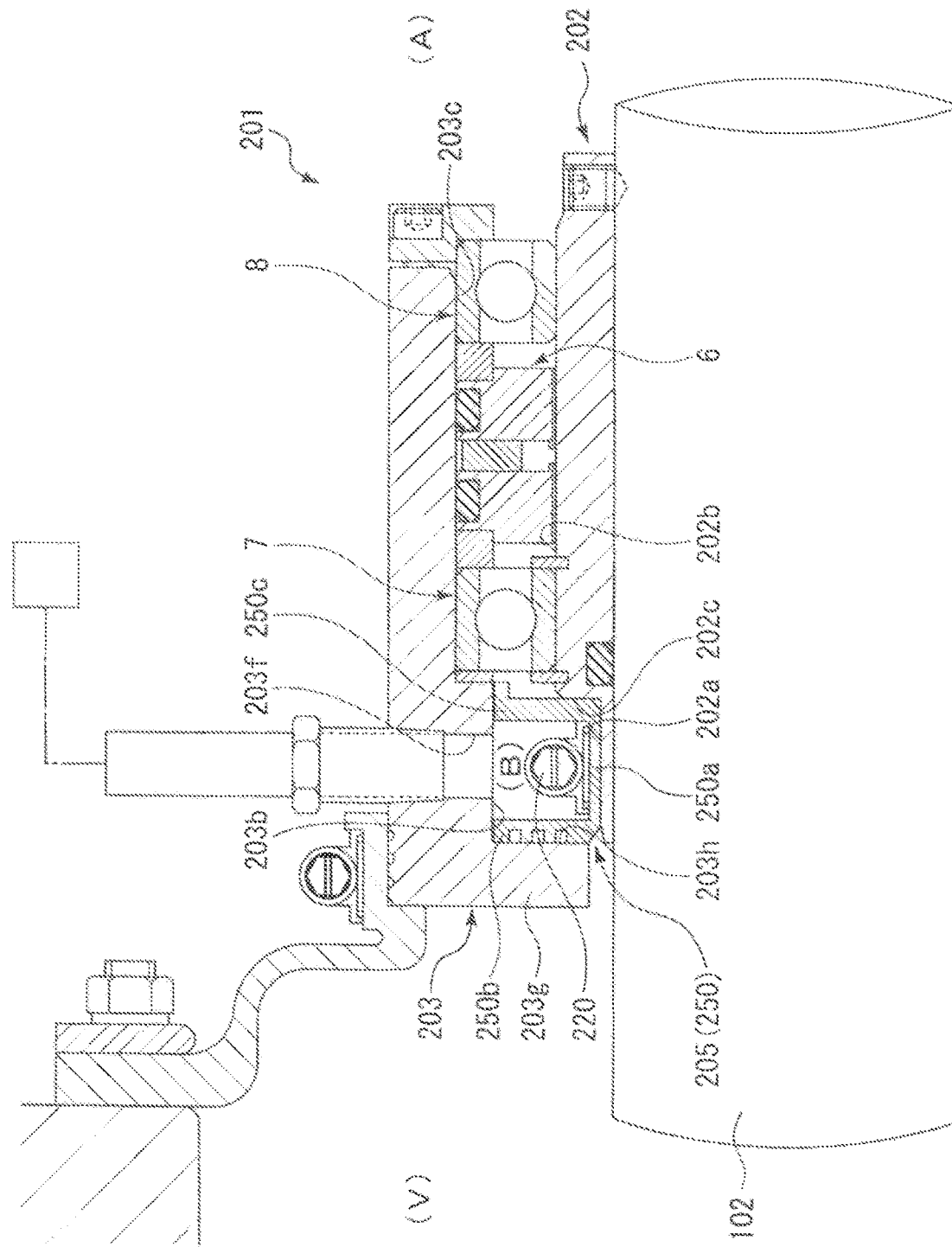
FIG. 2 is a front sectional view showing a second embodiment of the shaft seal device according to the present invention.

As shown in FIG. 2, in a shaft seal device 201 in the second embodiment, a sleeve 202 is formed by making an axially interior side part thinner in a stepped cylindrical shape formed by a first outer peripheral surface 202a in which an auxiliary seal portion 205 is arranged on the axially interior side, and a second outer peripheral surface 202b formed to have a larger diameter than the first outer peripheral surface 202a on the axially exterior side of the first outer peripheral surface 202a, the second outer peripheral surface in which a magnetic fluid seal portion 6 and bearings 7, 8 are arranged. On the axially exterior side of the first outer peripheral surface 202a, an annular surface portion 202c extending in the radial direction is formed. An outer diameter part of this annular surface portion 202c is continuous to an axially interior side part of the second outer peripheral surface 202b.

In a seal cover 203, by an end portion on the axially interior side of a first inner peripheral surface 203b in which the auxiliary seal portion 205 is arranged projecting to the inner diameter side, an annular flange portion 203g is formed. An outer diameter side part of an annular surface portion 203h on the axially exterior side of the flange portion 203g is orthogonal and continuous to an axially exterior side part of the first inner peripheral surface 203b.

The auxiliary seal portion 205 is formed by a V ring seal 250 which is made of resin and serves as a contact seal. The V ring is air-tightly fixed to an outer periphery of the sleeve 202 by tightly fastening a main body portion 250a of the V ring 250 to the first outer peripheral surface 202a of the sleeve 202 by a hose band 220 in a state where the main body portion is sandwiched between the annular surface portion 203h of the seal cover 203 and the annular surface portion 202c of the sleeve 202.

The V ring seal 250 forming the auxiliary seal portion 205 exerts a sealing property by biasing to the axially interior side by rubber elasticity in a state where a lip portion 250b formed on the axially interior side is pushed to the annular surface portion 203h of the seal cover 203. By an outer diameter side end portion of a standing portion 250c formed on the axially exterior side being slightly separated from the first inner peripheral surface 203b of the seal cover 203 and becoming contactless, a gap is formed therebetween.

Between the first and second inner peripheral surfaces 203b, 203c of the seal cover 3 forming the shaft seal device 201 and the first and second outer peripheral surfaces 202a, 202b of the sleeve 202, a pressure buffering chamber B in which pressure is maintained to be lower than pressure of the exterior of a vacuum dryer, that is, the atmospheric pressure of a space A, is provided between the auxiliary seal portion 205 and the magnetic fluid seal portion 6.

In the seal cover 203, a communication passage 203f providing communication between the pressure buffering chamber B and a vacuum pump is provided at a position between the auxiliary seal portion 205 and the bearing 7 on the axially interior side, in detail, between the lip portion 250b on the axially interior side of the V ring seal 250 forming the auxiliary seal portion 205 and the standing portion 250c on the axially exterior side.

According to the aforesaid second embodiment, in the shaft seal device 201, the pressure of the pressure buffering chamber B provided between the auxiliary seal portion 205 and the magnetic fluid seal portion 6 is maintained to be lower than the atmospheric pressure of the space A of the exterior of the vacuum dryer, in detail, to be equivalent to pressure of a sealed space V of the interior of the vacuum dryer. Thereby, a pressure difference between the sealed space V of the interior of the vacuum dryer in a vacuum state and the pressure buffering chamber B is small. Thus, even when a sealing property of the auxiliary seal portion 205 is lowered by an inclination or vibration of a rotation shaft 102, it is possible to maintain a sealing property and durability of the magnetic fluid seal portion 6.

Since in the seal cover 203, the communication passage 203f communicating with the pressure buffering chamber B is provided at the position between the lip portion 250b on the axially interior side of the V ring seal 250 forming the auxiliary seal portion 205 and the standing portion 250c on the axially exterior side in the axial direction, it is possible to prevent foreign substances such as a contaminant flowing into the pressure buffering chamber B from reaching the magnetic fluid seal portion 6 on the axially exterior side by the standing portion 250c, and discharge from the communication passage 203f by an operation of the vacuum pump 10. Thus, it is possible to prevent a decrease in the sealing property and the durability of the magnetic fluid seal portion 6, and also suppress an inflow of a magnetic fluid 62 and the foreign substances such as the contaminant to the interior side.

Since the auxiliary seal portion 205 is formed by the V ring seal 250, a seal portion between the lip portion 205b and the annular surface portion 203h of the seal cover 203 is formed to extend in the radial direction. Thus, it is possible to form the auxiliary seal portion 205 short in the axial direction, and the axial length of the unitized shaft seal device 201 becomes short. Thereby, it is possible to make the seal cover 203 not easily incline with respect to an inclination of the rotation shaft 102.

Third Embodiment

Next, a third embodiment of the shaft seal device according to the present invention will be described with reference to FIG. 3. The same constituent parts as the constituent parts shown in the above embodiments will be given the same reference signs and duplicated description will be omitted.

Figure 3:
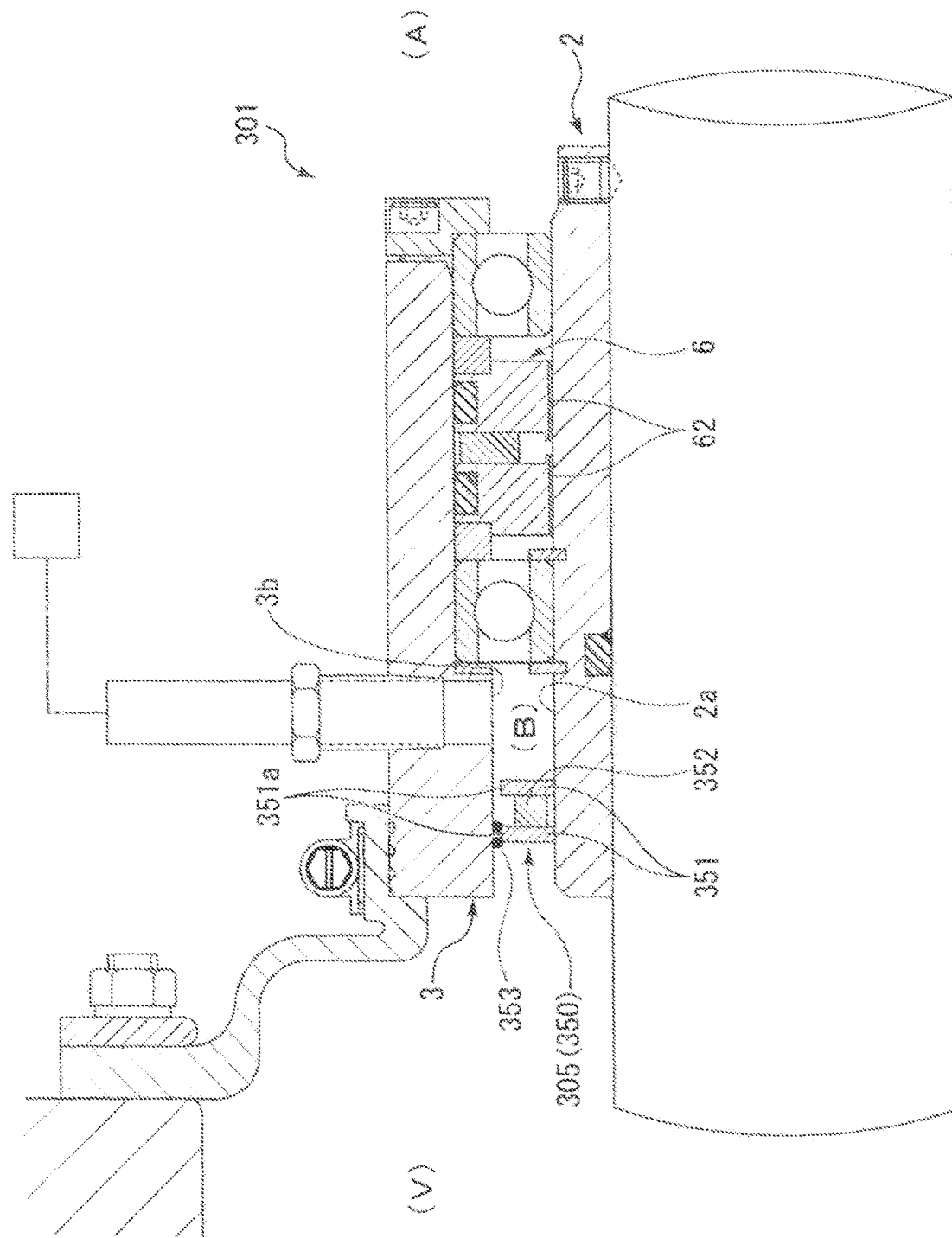
FIG. 3 is a front sectional view showing a third embodiment of the shaft seal device according to the present invention.

As shown in FIG. 3, in a shaft seal device 301 in the third embodiment, an auxiliary seal portion 305 is formed by a magnetic fluid dust seal 350 which includes a pair of annular pole pieces 351, 351, a permanent magnet 352 arranged between the pole pieces 351, 351, and a magnetic fluid 353.

The pole pieces 351, 351 are air-tightly fixed to an outer peripheral surface 2a of a sleeve 2, and formed to have an outer diameter smaller than an outer diameter of a seal cover 3. In a gap formed between outer peripheral surfaces 351a, 351a of the pole pieces 351, 351 and a first inner peripheral surface 3b of the seal cover 3, a seal film of the magnetic fluid 353 is formed and held in a gap in the pole piece 351 on the axially interior side by magnetic force of a magnetic circuit formed by the pole pieces 351, 351 and the permanent magnet 352. Thereby, a portion between a sealed space V of the interior of a vacuum dryer and a pressure buffering chamber B to be described later is sealed. The magnetic fluid 353 has a base oil of perfluoropolyether as well as a magnetic fluid 62 forming a magnetic fluid seal portion 6.

According to the third embodiment, in the shaft seal device 301, since the auxiliary seal portion 305 is formed by the magnetic fluid dust seal 350, movement of a fluid between the sealed space V of the interior of the vacuum dryer and the pressure buffering chamber B is reliably prevented, and it is possible to prevent an inflow of foreign substances such as a contaminant.

In addition, since the auxiliary seal portion 305 is formed by the magnetic fluid dust seal 350, even upon leaking to the axially interior side, the magnetic fluid 62 of the magnetic fluid seal portion 6 is absorbed and held in a gap by the pole piece 351 on the axially exterior side of the magnetic fluid dust seal 350 by magnetic force. Thus, it is possible to prevent an inflow of the magnetic fluid 62 to the interior side.

Fourth Embodiment

Next, a fourth embodiment of the shaft seal device according to the present invention will be described with reference to FIG. 4. The same constituent parts as the constituent parts shown in the above embodiments will be given the same reference signs and duplicated description will be omitted.

Figure 4:
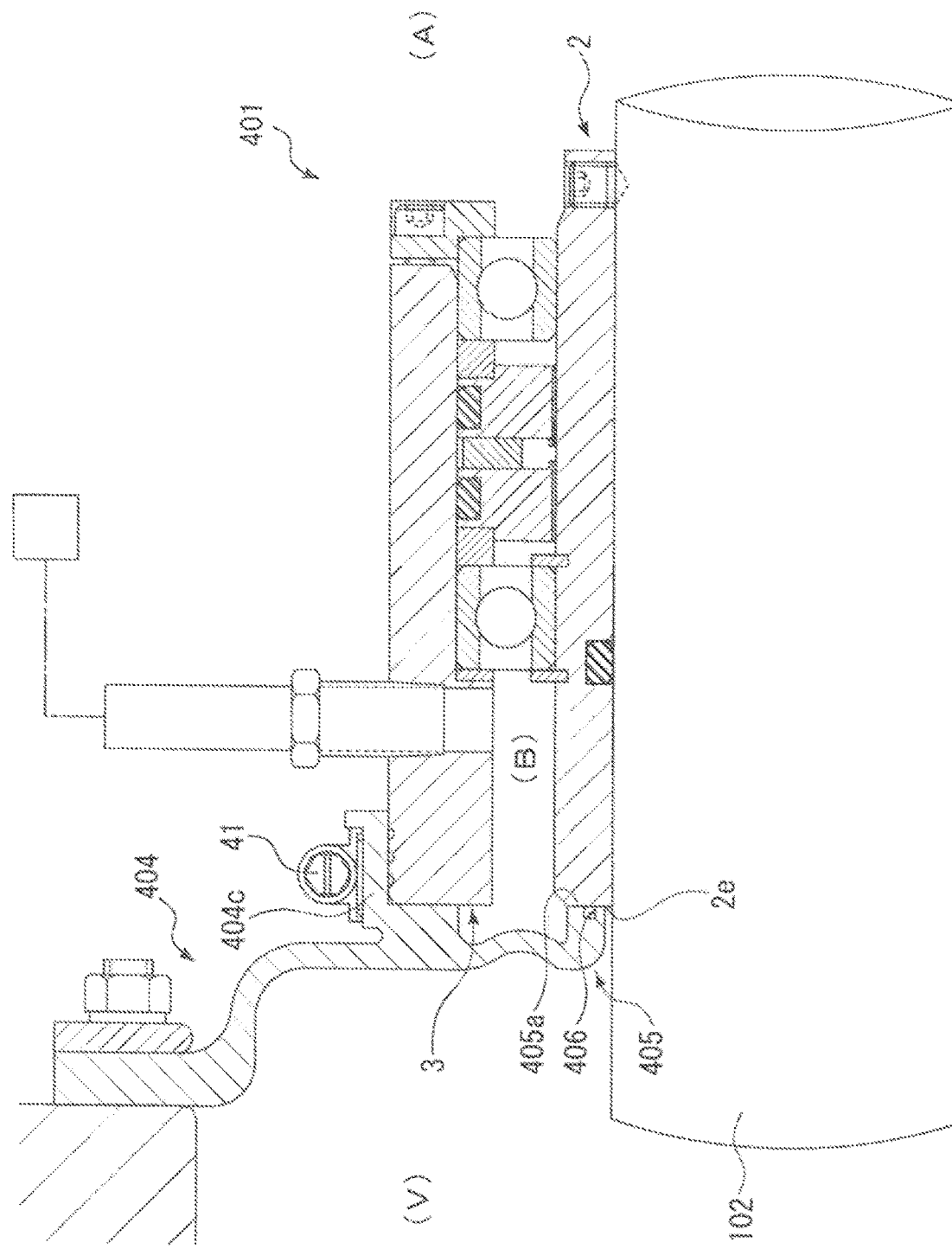
FIG. 4 is a front sectional view showing a fourth embodiment of the shaft seal device according to the present invention.

As shown in FIG. 4, in a shaft seal device 401 in the fourth embodiment, in a diaphragm 404, a lip seal portion 405 (i.e., auxiliary seal portion) further extending from an end portion 404c on the inner diameter side which is tightly fastened to a seal cover 3 by a hose band 41 while curving to the inner diameter side is formed, and vacuum grease 406 is filled in an annular groove portion of an end surface 405a on the axially exterior side of the lip seal portion 405 abutted with a side end surface 2e on the axially interior side of a sleeve 2.

According to the forth embodiment, in the shaft seal device 401, due to lubrication with the side end surface 2e on the axially interior side of the sleeve 2 by the vacuum grease 406 filled in the annular groove portion of the end surface 405a on the axially exterior side of the lip seal portion 405 provided in the diaphragm 404, almost no abrasion powder is generated. Thus, it is possible to prevent an inflow of foreign substances such as a contaminant between a sealed space V of the interior of a vacuum dryer and a pressure buffering chamber B.

Since the lip seal portion 405 of the diaphragm 404 forms a seal portion between the end surface 405a on the axially exterior side and the side end surface 2e on the axially interior side of the sleeve 2, a radial distance of the seal portion from the center axis of a rotation shaft 102 is short. Thus, it is possible to reduce resistance by rotation. The lip seal portion 405 serving as an auxiliary seal portion in the fourth embodiment is excluded from the concept of unitization described in the first embodiment.

Fifth Embodiment

Next, a fifth embodiment of the shaft seal device according to the present invention will be described with reference to FIG. 5. The same constituent parts as the constituent parts shown in the above embodiments will be given the same reference signs and duplicated description will be omitted.

Figure 5:
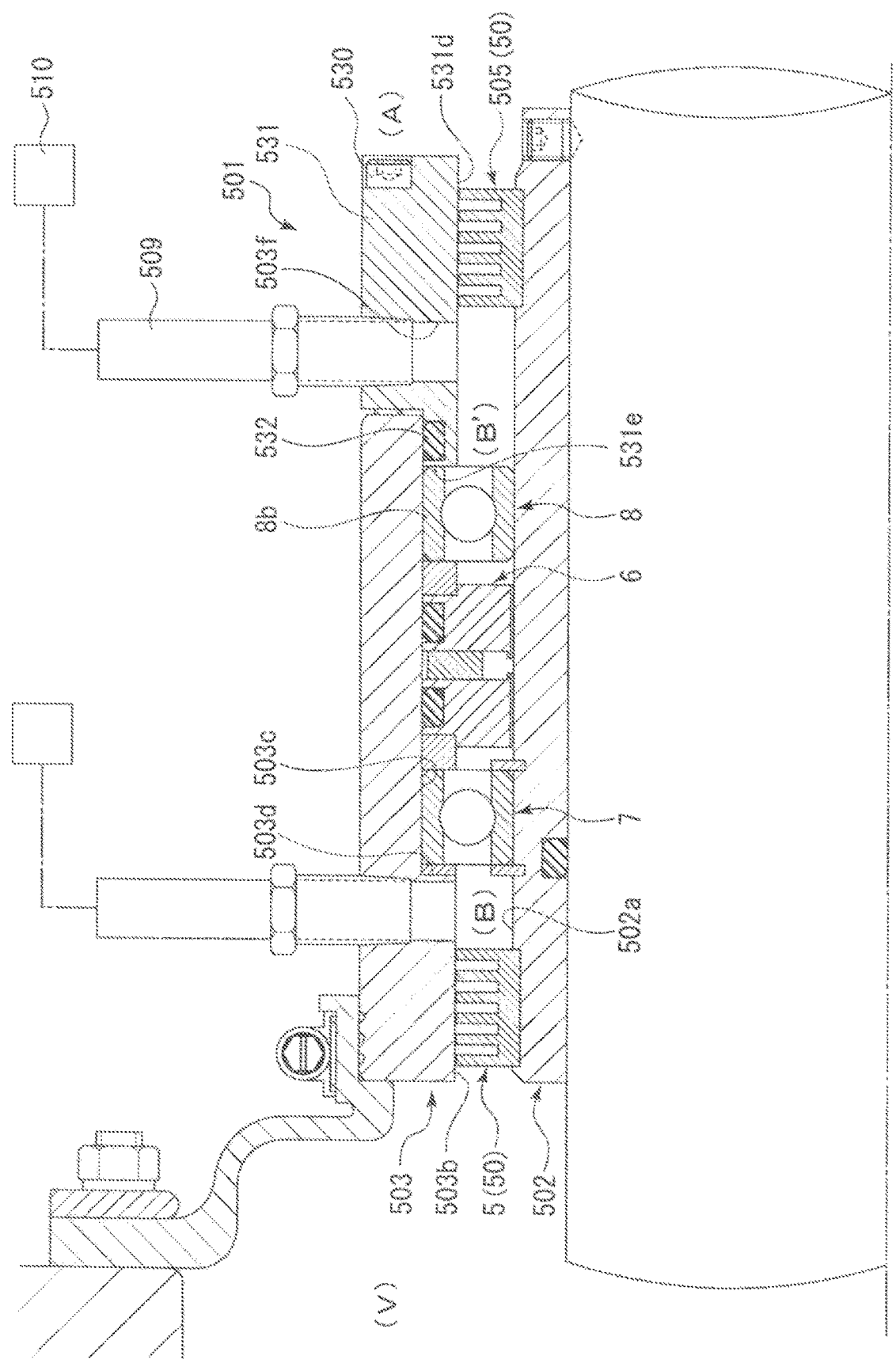
FIG. 5 is a front sectional view showing a fifth embodiment of the shaft seal device according to the present invention.

As shown in FIG. 5, in a shaft seal device 501 in the fifth embodiment, a seal cover 503 is formed in a cylindrical shape formed by a first inner peripheral surface 503b in which an auxiliary seal portion 5 is arranged on the axially interior side, and a second inner peripheral surface 503c formed to have a larger diameter than the first inner peripheral surface 503b on the axially exterior side of the first inner peripheral surface 503b, the second inner peripheral surface in which a magnetic fluid seal portion 6 and bearings 7, 8 are arranged. By fastening an annular regulating member 531 to an end portion on the axially exterior side of the second inner peripheral surface 503c by a bolt 530, the magnetic fluid seal portion 6 and the bearings 7, 8 are fixed between an annular surface portion 503d of the seal cover 503 and the regulating member 531. An O ring 532 is arranged in an annular recess portion of the regulating member 531, and a portion between the seal cover 503 and the regulating member 531 is sealed. In the regulating member 531, an auxiliary seal portion 505 is arranged on a third inner peripheral surface 531d formed to have a smaller diameter than the second inner peripheral surface 503c. A side end portion 531e on the axially interior side of the regulating member 531 is abutted with an outer ring 8b of the bearing 8. The auxiliary seal portion 505 arranged on the third inner peripheral surface 531d is formed by a labyrinth seal 50 having the substantially same configuration as the auxiliary seal portion 5.

Between the second inner peripheral surface 503c of the seal cover 503 forming the shaft seal device 501 and the third inner peripheral surface 531d of the regulating member 531, and an outer peripheral surface 502a of a sleeve 502, a pressure buffering chamber B' in which pressure is maintained to be lower than pressure of the exterior of a vacuum dryer, that is, the atmospheric pressure of a space A, and higher than pressure of a pressure buffering chamber B is formed at a position between the auxiliary seal portion 505 and the magnetic fluid seal portion 6.

In the regulating member 531, a communication passage 503f communicating with the pressure buffering chamber B' is provided at a position between the auxiliary seal portion 505 and the bearing 8 on the axially exterior side. A vacuum pump 510 is connected to the communication passage 503f by a flexible pipe 509 from the outer periphery side of the seal cover 503. By the vacuum pump 510, in the pressure buffering chamber B', the pressure is maintained to be lower than the atmospheric pressure of the space A.

According to the fifth embodiment, in the shaft seal device 501, the pressure of the pressure buffering chamber B' provided between the auxiliary seal portion 505 and the magnetic fluid seal portion 6 is maintained to be lower than the atmospheric pressure of the space A of the exterior of the vacuum dryer, and the communication passage 503f communicating with the pressure buffering chamber B' is provided at the position between the auxiliary seal portion 505 and the bearing 8 on the axially exterior side. Thereby, it is possible to discharge abrasion powder flowing into the pressure buffering chamber B' and foreign substances such as a contaminant passing through the auxiliary seal portion 505 and flowing in from the space A of the exterior of the vacuum dryer from the communication passage 503*f* by an operation of the vacuum pump 510 without reaching the magnetic fluid seal portion 6. Thus, it is possible to prevent a decrease in a sealing property and durability of the magnetic fluid seal portion 6 even in an environment other than a clean room. In the pressure buffering chamber B', the pressure is maintained to be lower than the atmospheric pressure of the space A and higher than the pressure of the pressure buffering chamber B. Thus, the pressure is lowered stepwise from the space A to the pressure buffering chamber B, and radical movement of a gas is not generated between the space A and the pressure buffering chamber B.

INDUSTRIAL APPLICABILITY

The shaft seal device according to the present invention can be favorably a powder machine such as a vacuum dryer, a rotary valve, and a rotary feeder.

The embodiments of the present invention are described above with the drawings. However, specific configurations are not limited to these embodiments and changes and additions within the range not departing from the gist of the present invention are included in the present invention.

For example, in the above embodiments, the mode in which the pair of bearings 7, 8 is provided on the axially interior side and on the axially exterior side of the magnetic fluid seal portion 6 is described. However, the present invention is not limited to this but a bearing may be provided on any one of the axially interior side and the axially exterior side of the magnetic fluid seal portion 6. The bearings to be applied are not limited to ball bearings but may be roller bearings.

No sleeve 2, 202, 502 may be provided on the outer periphery of the rotation shaft 102.

The communication passage of the seal cover may be arranged at a position on the axially exterior side of the bearing (i.e., a position between the bearing and the magnetic fluid seal portion) between the auxiliary seal portion and the magnetic fluid seal portion. As in the first embodiment, it is preferable to arrange the communication passage 3*f* of the seal cover 3 at the position on the axially interior side of the bearing 7 (i.e., a position between the auxiliary seal portion 5 and the bearing 7) between the auxiliary seal portion 5 and the magnetic fluid seal portion 6 since a contaminant flowing into the pressure buffering chamber B does not easily come into the bearing.

REFERENCE SIGNS LIST

1 Shaft seal device
2 Sleeve
3 Seal cover
3*f* Communication passage
4 Diaphragm (flexible member)
5 Auxiliary seal portion
6 Magnetic fluid seal portion
7, 8 Bearing
7*a*, 8*a* Inner ring
7*b*, 8*b* Outer ring
9 Pipe
10 Vacuum pump
50 Labyrinth seal
60 Pole piece
61 Permanent magnet
62 Magnetic fluid
100 Housing
101 Axial hole
102 Rotation shaft
201 Shaft seal device
205 Auxiliary seal portion
250 V ring seal
250*b* Lip portion
250*c* Standing portion
301 Shaft seal device
305 Auxiliary seal portion
350 Magnetic fluid dust seal
351 Pole piece
352 Permanent magnet
353 Magnetic fluid
401 Shaft seal device
404 Diaphragm (flexible member)
405 Lip seal portion (auxiliary seal portion)
406 Vacuum grease
501 Shaft seal device
503*f* Communication passage
505 Auxiliary seal portion
509 Pipe
510 Vacuum pump
A Space (external space)
B, B' Pressure buffering chamber
V Sealed space (internal sealed space)

The invention claimed is:

1. A shaft seal assembly sealing between a housing and a rotation shaft inserted into an axial hole of the housing, comprising:
a seal cover formed in a cylindrical shape and provided on an outer periphery of the rotation shaft;
a flexible member that connects the seal cover to the housing;
an auxiliary seal portion provided on an interior side of the shaft seal device in an axial direction of the seal cover;
a magnetic fluid seal portion provided on an exterior side of the shaft seal device from the auxiliary seal portion in the axial direction of the seal cover; and
a bearing unit that supports a load of the magnetic fluid seal portion,
the shaft seal device sealing an annular clearance formed between the axial hole of the housing and the rotation shaft inserted into the axial hole, wherein
a pressure buffering chamber in which pressure is maintained to be lower than pressure in an external space of the housing is provided between the auxiliary seal portion and the magnetic fluid seal portion in the seal cover, wherein
in the seal cover, a communication passage providing communication between the pressure buffering chamber and a vacuum pump is provided at a position between the auxiliary seal portion and the magnetic fluid seal portion in the axial direction of the seal cover,
the bearing unit includes a pair of bearings between which the magnetic fluid seal portion is sandwiched in the axial direction, and
the communication passage is positioned between the auxiliary seal portion and one of the pair of bearings positioned on the interior side.

2. The shaft seal assembly according to claim 1, wherein the pressure in the pressure buffering chamber is maintained to be equivalent to pressure in an internal sealed space of the housing.

3. The shaft seal assembly according to claim 1, wherein the auxiliary seal portion is formed by a contactless seal.

4. The shaft seal assembly according to claim 1, wherein the flexible member is a diaphragm having an aligning property.

5. The shaft seal assembly according to claim 1, wherein the vacuum pump is connected to the communication passage by a flexible pipe from an outer periphery side of the seal cover.

6. The shaft seal assembly according to claim 1, further comprising:
a sleeve fixed to the outer periphery of the rotation shaft, wherein
the auxiliary seal portion, the magnetic fluid seal portion and the bearing unit are integrally provided between an inner periphery of the seal cover and an outer periphery of the sleeve, thereby unitizing the sleeve, the seal cover, the auxiliary seal portion, the magnetic fluid seal portion and the bearing unit.

7. The shaft seal assembly according to claim 6, wherein an inner ring of one of the pair of bearings is not regulated in the axial direction with respect to the outer periphery of the sleeve, or an outer ring of one of the pair of bearings is not regulated in the axial direction with respect to the inner periphery of the seal cover.

8. The shaft seal assembly according to claim 2, wherein the auxiliary seal portion is formed by a contactless seal.

9. The shaft seal assembly according to claim 2, wherein the flexible member is a diaphragm having an aligning property.

10. The shaft seal assembly according to claim 2, wherein the vacuum pump is connected to the communication passage by a flexible pipe from an outer periphery side of the seal cover.

11. The shaft seal assembly according to claim 2, further comprising:
a sleeve fixed to the outer periphery of the rotation shaft, wherein
the auxiliary seal portion, the magnetic fluid seal portion and the bearing unit are integrally provided between an inner periphery of the seal cover and an outer periphery of the sleeve, thereby unitizing the sleeve, the seal cover, the auxiliary seal portion, the magnetic fluid seal portion and the bearing unit.

12. The shaft seal assembly according to claim 11, wherein
an inner ring of one of the pair of bearings is not regulated in the axial direction with respect to the outer periphery of the sleeve, or an outer ring of one of the pair of bearings is not regulated in the axial direction with respect to the inner periphery of the seal cover.

13. The shaft seal assembly according to claim 3, wherein the flexible member is a diaphragm having an aligning property.

14. The shaft seal assembly according to claim 3, further comprising:
a sleeve fixed to the outer periphery of the rotation shaft, wherein
the auxiliary seal portion, the magnetic fluid seal portion and the bearing unit are integrally provided between an inner periphery of the seal cover and an outer periphery of the sleeve, thereby unitizing the sleeve, the seal cover, the auxiliary seal portion, the magnetic fluid seal portion and the bearing unit.

15. The shaft seal assembly according to claim 14, wherein
an inner ring of one of the pair of bearings is not regulated in the axial direction with respect to the outer periphery of the sleeve, or an outer ring of one of the pair of bearings is not regulated in the axial direction with respect to the inner periphery of the seal cover.

* * * * *